(No Model.)
J. LARMANJAT.
PRESS FOR MOLDING ORNAMENTAL TILES OR OTHER ARTICLES OF CEMENT.
No. 319,826. Patented June 9, 1885.
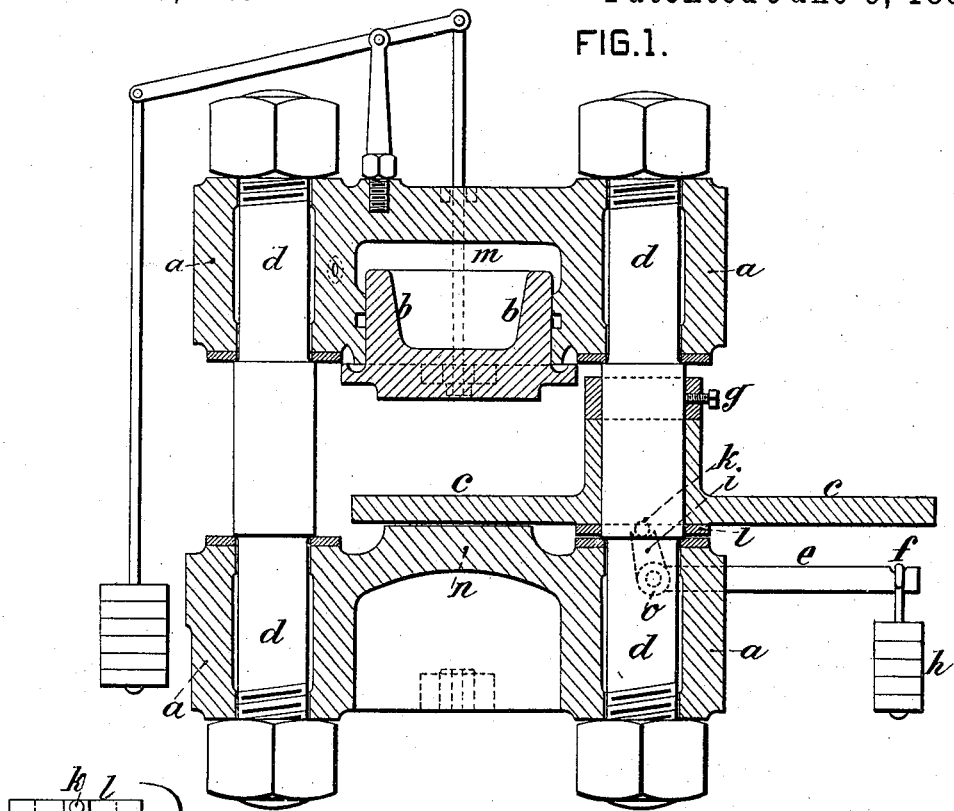
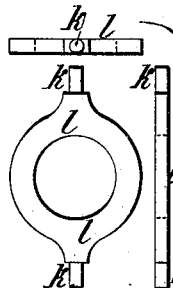
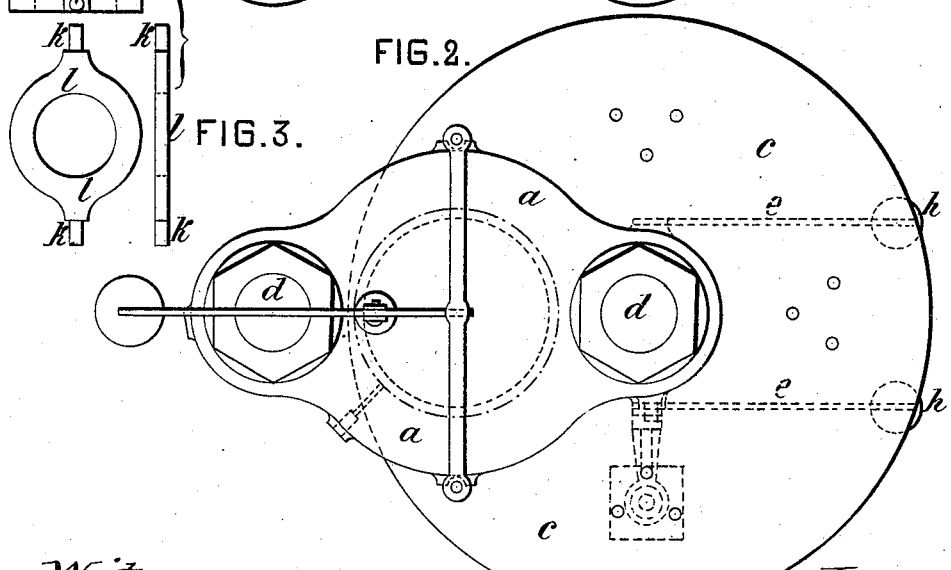
Witnesses:
C. Sedgwick
Edgar Tate
Inventor:
J. Larmanjat
By Munn & Co.
Attorneys.

United States Patent Office.

JEAN LARMANJAT, OF PARIS, FRANCE.

PRESS FOR MOLDING ORNAMENTAL TILES OR OTHER ARTICLES OF CEMENT.

SPECIFICATION forming part of Letters Patent No. 319,826, dated June 9, 1885.

Application filed April 21, 1885. (No model.)

*To all whom it may concern:*

Be it known that I, JEAN LARMANJAT, of the city of Paris, France, have invented new and useful Improvements in Presses for Molding Ornamental Tiles or other Articles of Cement, of which the following is a full, clear, and exact description.

This invention relates to an improved press for molding ornamental tiles or other articles of cement. In presses of the kind heretofore made portions of the molding material exuded from the molds. Dust and grit are liable to accumulate gradually between the mold-carrying table and the press-frame, whereby the table frequently becomes clogged sufficiently to retard, if not to altogether prevent, its rotation.

The object of this invention is to obviate this objection by imparting a slight vertical movement to the mold-table by means of counterweighted levers, springs, or otherwise.

The accompanying drawings illustrate, by way of example, the main portions of a press for molding tiles, &c., provided with a counterweighted lever for raising the mold-table.

Figure 1 is a section taken through the center of the press; Fig. 2, a plan of same, and Fig. 3 a detail of the collar carrying the pivots actuated by the lifting mechanism.

The same letters of reference represent the same parts in the several figures.

$a\ a$ are a pair of frames traversed by bolts $d$, the upper frame being recessed at $m$ to receive the piston.

The material to be molded is placed on a table, $c$, having perforations for enabling a mold to be attached thereto. The mold-table is fitted to turn upon the bolt $d$, upon which it is mounted as an axis. The vertical motion of this table is limited by a collar and set-screw, $g$. By rotating the table the material to be molded is brought beneath piston $b$, which is then lowered.

Owing to the pressure applied by the piston to the plastic material portions of the latter expressed by the molds, together with dust and dirt of all kinds, become inserted between the mold-table $c$ and the under frame, $u$, and in time accumulate to such an extent as to entirely prevent the table from turning. To obviate this objection, the table is provided with a lifting arrangement of any suitable kind, so as to free it from obstruction to its movement. For this purpose the table $c$ is made to rest on a collar, $l$, provided with pivots $k$, (see Fig. 3,) which are supported on the notched upper ends of the short arms of two levers bent to a slightly-obtuse angle, $i\ o\ e$, and oscillating on point $o$ as a center. The long arms of the levers are notched at their ends $f$, for hanging the counter-weights $h$ thereon. In this manner the vertical motion of the table $c$ may be limited by the ring, which is fitted upon the bolt $d$ at the convenient height by means of the screw $g$.

This vertical motion will be imparted to the table by the counterweighted levers $i\ o\ e$, so as to free the table from the obstruction and enable it to turn freely upon the bolt $d$. This relief arrangement is also applicable to other machines of the same kind, or otherwise, and such modifications may be made in the machine as will insure the attainment of the same result, as experience may suggest.

I claim—

1. In a press for molding tiles of ceramic material, the method of relieving the mold-table from obstruction by a rising movement, as described.

2. The means of relieving the mold-table shown in the drawings, consisting of a collar, $l$, having pivots $k$, and elbow-levers $i\ o\ e$, with counter-weights, as described.

The foregoing specification of my improvements in presses for molding ornamental tiles or other articles of cement signed by me this 24th day of March, 1885.

JEAN LARMANJAT.

Witnesses:
ROBT. M. HOOPER,
ALBERT MOREAU.